May 6, 1924.

J. P. KEY 1,493,078

COTTON CHOPPER

Filed Feb. 6, 1923   2 Sheets-Sheet 1

Inventor
John P. Key
by
Attorney

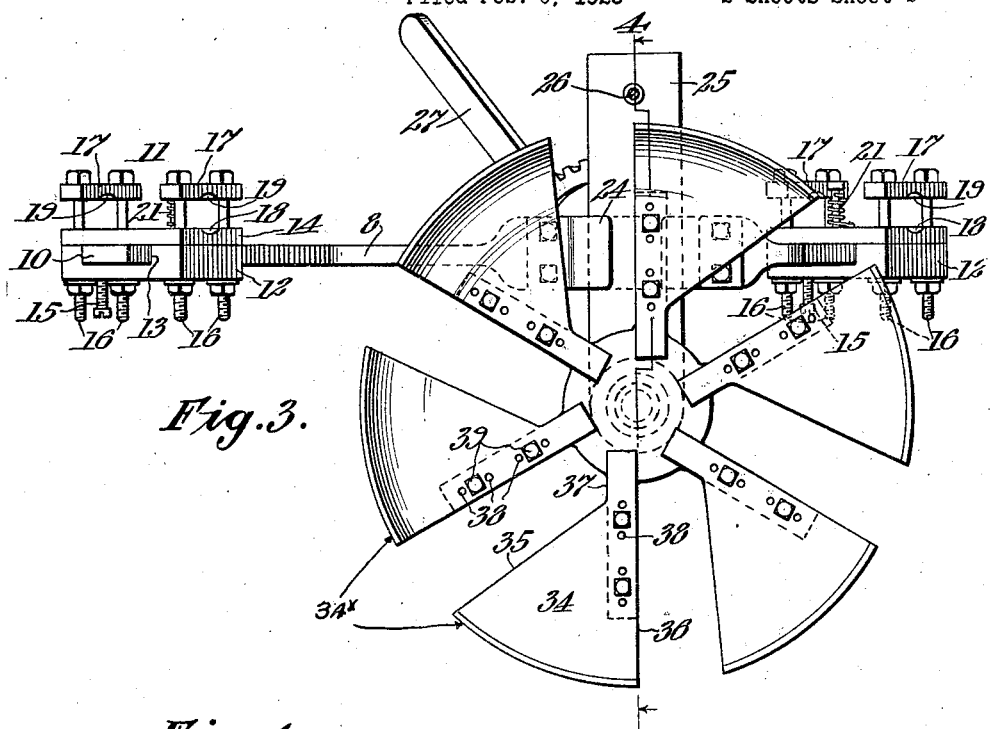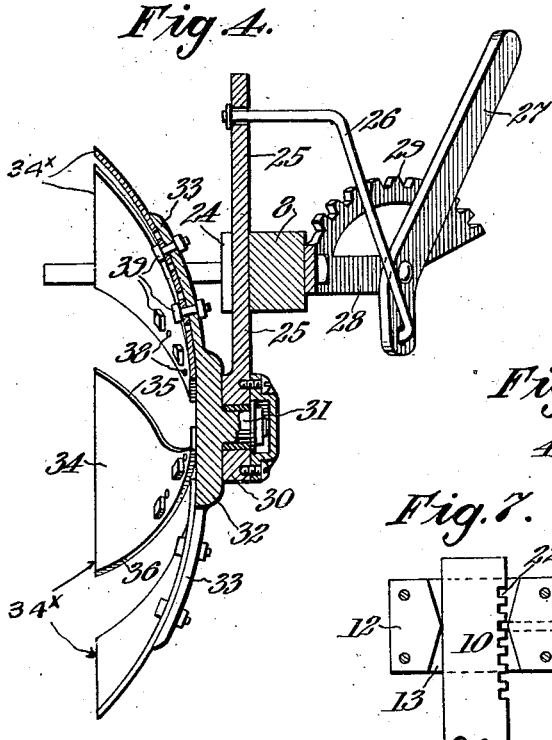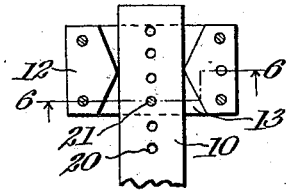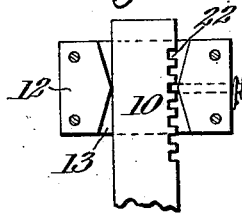

Patented May 6, 1924.

1,493,078

UNITED STATES PATENT OFFICE.

JOHN P. KEY, OF COOLEDGE, TEXAS.

COTTON CHOPPER.

Application filed February 6, 1923. Serial No. 617,302.

*To all whom it may concern:*

Be it known that I, JOHN P. KEY, a citizen of the United States, residing at Cooledge, in the county of Limestone and State of Texas, have invented a certain new and useful Improvement in Cotton Choppers, of which the following is a full, clear, and exact description.

The object of this invention is to provide an attachment for cultivators and like implements for use more particularly in connection with cotton plant growing, the attachment being self-contained and adapted to be applied to the frame of the cultivator when needed for chopping the plants and as readily detached when the cultivator is to be otherwise used.

The invention comprises a rotary cutter composed of a number of specially formed blades, adjustably mounted upon an axial member, the cutter itself being adjustably mounted upon a supporting beam which is adapted to be attached to a cultivator frame, the cutter deriving its rotary motion by contact with the earth, as I will proceed now to explain and finally claim.

Figure 1:
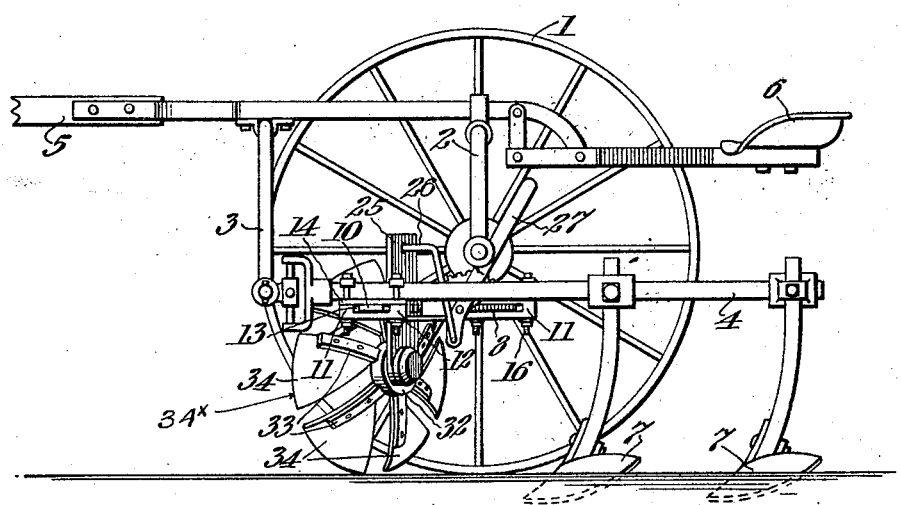
Figure 2:
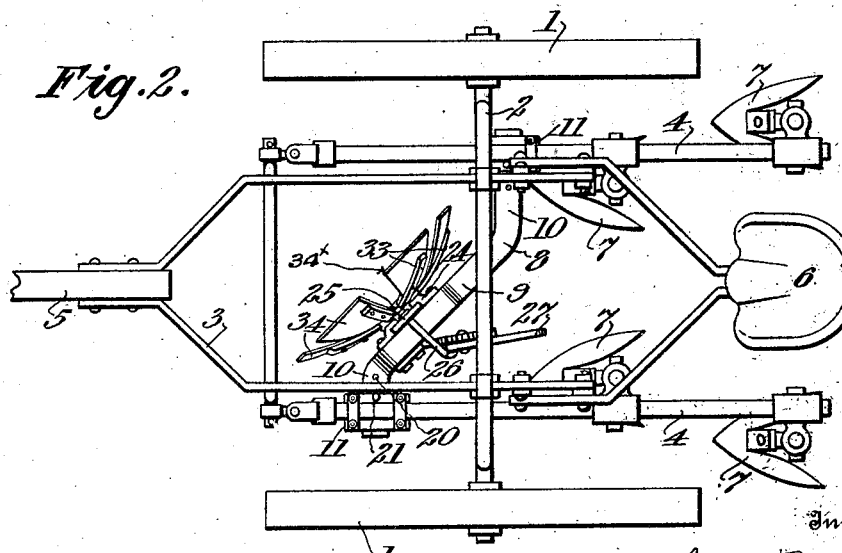

In the accompanying drawings illustrating the invention, in the several figures of which like parts are similarly designated, Figure 1 is a side elevation, and Fig. 2 is a top plan view of a conventionally shown wheeled cultivator having my attachment in position thereon. Fig. 3 is a front elevation of the attachment alone, on a larger scale. Fig. 4 is a vertical section on the line 4—4 of Fig. 3. Fig. 5 is an elevation of one form of beam clamping member with the front removed, and Fig. 6 is a cross-section on line 6—6 of Fig. 5, with the front in place. Fig. 7 is a view similar to Fig. 5 showing a modification.

No attempt is made to illustrate in detail the construction of a cultivator, but on the contrary, the showing in Figs. 1 and 2 is purely conventional, 1 being the wheels, 2 their axle, 3 the frame having the parallel bars 4, 5 the tongue, 6 the driver's seat, and 7 the plows or shares mounted upon the bars 4.

The attachment comprises a beam 8 with a central straight portion 9 extending diagonally with relation to the bars 4 and having the parallel ends 10, bearing the clamps 11 by which the beam may be adjustably and securely attached to the bars 4. As shown in Figs. 5, 6 and 7, each of these clamps comprises a block 12 having a double flaring recess 13 to receive the ends of the beam, a front plate 14 matching the block, one or more screws 15 to unite the block and front plate, and screw-bolts 16 having the connecting plates 17. The front plate 14 and the plates 17 are grooved, as at 18 and 19 respectively, to conform to and engage the bars 4, and when so engaged the beam is clamped to the bars. The double flaring recess 13 permits the adjustment of the beam to the lateral movements of the bars 4.

To provide for variations in the width of the frame, the ends 10 may have a series of perforations 20 to receive a spring or other locking pin 21 which passes through the front plate and block of the clamp as well as through the desired perforation in the beam end. As a modification of this adjusting feature, it is possible to secure similar results by providing the ends 10 with series of teeth or notches 22, Fig. 7, adapted to be engaged by spring pins 23.

As is known, it sometimes becomes necessary to set the power beams farther apart or closer together in plowing with different size plows and different aged plants. The adjusting feature described permits ready adaptation of the attachment to such changes in position of the frame members.

The central portion of the beam is provided with parallel outstanding lips 24, forming a guide for a cutter support 25 arranged vertically therein, and held adjustably therein by any suitable means, such as a rod 26 connected with a lever 27 pivoted to a bracket 28 which is supported upon the beam, said lever being held in adjusted position by engagement with a toothed segment 29 also mounted upon the beam or forming a part of the bracket 28. Thus the height of the cutter support from the earth may be adjusted.

The cutter support 25 is provided with any suitable bearing 30 for the stub-axle 31 of the cutter. This axle may be made integral with a casting 32 having the radial arms 33 to which are bolted or otherwise secured the blades 34 which with the parts 31, 32 and 33 constitute what is herein referred to as the rotary cutter. These blades are of concavo-convex form and have the peripheral cutting edges $34^x$, with the edges 35 inclined or tangential to the casting 32 and the opposite edges 36 straight or radial, the tangential edges having the radial inner terminals 37 which lap over the casting 32.

As will be seen by reference to Figs. 1 and 2, this rotary cutter is arranged in advance of the axle of the cultivator and at an angle thereto, so as to cross the path of movement of the cultivator and thus be in proper position to engage the plants to be chopped, the blades, of course, being arranged with their edges 35 and 36 far enough apart to give the necessary clearance for the plants.

As already stated, the cutter is rotated by surface contact with the ground, and consequently there is no necessity for gearing this cutter to the cultivator mechanism in order to drive it positively, as is customary in many forms of cotton choppers.

The blades are so shaped and spaced apart that a straight opening between adjacent blades is left on one side of a straight line through the center of the wheel, thereby permitting plants to pass through unharmed up to any given height.

These blades also are provided with a number of holes 38 for the reception of the bolts 39, so that the blades may be adjusted outwardly to secure wider spacing between adjacent blades, or adjusted inwardly toward the axial center of the cutter to provide narrower spaces between the blades. This adjustability of the blades also provides for the increasing or diminishing of the size of the cutter to meet the requirements of the farmer. Some farmers prefer to chop the cotton say eight inches, and others from ten to twelve inches and still others even further between the hills.

Provision may be made in the mounting of the cutter for slanting it or for regulating its slant.

As already indicated, the chopper is fastened to the cultivator beams directly in front of the plows. It operates without interfering in any way with the plowing. The extra draft is negligible, since the chopper is in the form of a rotary wheel with sharp cutters and working only to a shallow depth in the earth, and as already stated, rotary motion is given to the cutter by a direct ground drive.

It is to be noted also that when the chopper is mounted upon a cultivator, the chopping and plowing may proceed at the same time, or when necessary or desirable either one or the other may be thrown out of commission or the chopper removed.

Variations in the details of construction and the arrangement of parts are within the principle of the invention as hereinafter claimed.

What I claim is:—

1. A cotton chopper attachment for cultivators and the like, comprising a beam having ends adapted to be engaged with the cultivator frame and an intermediate oblique portion, and a rotary cutter mounted on the oblique portion of the beam and vertically adjustable thereon.

2. A cotton chopper attachment for cultivators and the like, comprising a beam having ends adapted to be engaged with the cultivator frame and an intermediate oblique portion, a rotary cutter, and a cutter support adjustably mounted on the beam and carrying the cutter on its lower end, said cutter having a ground drive.

3. A cotton chopper attachment for cultivators and the like, comprising a beam having ends adapted to be engaged with the cultivator frame and an intermediate oblique portion, and a cutter support freely adjustable in the direction of its length on the said beam and having a bearing on its lower end in which the cutter is rotatably mounted.

4. A rotary cutter for cotton choppers, comprising an axial portion having radial arms, and a series of blades attached to said arms, each of said blades having a peripheral cutting edge and one side edge inclined and the other straight, the inclined edge of one blade and the straight edge of the next adjacent blade forming a substantially straight opening between these blades.

5. A rotary cutter for cotton choppers, comprising an axial portion having radial arms, and a series of blades attached to said arms, each of said blades having a peripheral cutting edge and one side edge inclined and the other edge straight, the inclined edge of one blade and the straight edge of the next adjacent blade forming a substantially straight opening between these blades, said blades adjustably mounted on said arms so as to increase or decrease the width of the opening.

6. A rotary cutter for cotton choppers, comprising an axial portion having radial arms, and a series of blades attached to said arms, each of said blades having a longitudinal edge arranged tangentially with relation to the axial portion and an opposite edge radially thereto.

7. A rotary cutter for cotton choppers, comprising an axial portion having radial arms, and a series of concavo-convex blades attached to said arms, one of the opposite longitudinal edges of said blades being substantially tangential to the axial portion and the other radial thereto.

8. A chopper attachment for cultivators, comprising a beam having substantially parallel terminals and an intermediate oblique portion, and a rotary cutter mounted on the oblique portion, the said terminals of the beam provided with clamps for mounting the beam on a cultivator frame, and said ends having a movable connection with the clamps.

9. A chopper attachment for cultivators, comprising a beam having substantially parallel terminals and an intermediate oblique portion, and a rotary cutter mounted on the oblique portion, the said terminals of the beam provided with clamps for mounting the beam on a cultivator frame, and said ends having a movable and adjustable connection with the clamps.

10. A chopper attachment for cultivators, comprising a beam having substantially parallel terminals and an intermediate oblique portion, and a rotary cutter mounted on the oblique portion, the said terminals of the beam provided with clamps for mounting the beam on a cultivator frame and said clamps having double-flaring recesses in which the terminals of the beam are movably mounted.

11. A cotton chopper attachment for cultivators and the like, comprising a beam, clamps on its ends for engaging opposite sides of the frame of the cultivator or other machine, said beam arranged diagonally on the frame and in advance of the plows, and a rotary cutter mounted on the beam between its ends and vertically adjustable thereon and ground driven.

12. A rotary cutter for cotton choppers, comprising an axial portion having radial arms and a series of blades attached to said arms and means to adjust said blades longitudinally on said arms.

In testimony whereof I have hereunto set my hand this 31st day of Jan., A. D. 1923.

JOHN P. KEY.

Witnesses:
S. R. WALLACE,
E. M. JOHNSON.